---

United States Patent [19]

Moulin et al.

[11] Patent Number: 4,558,501

[45] Date of Patent: Dec. 17, 1985

[54] CONTACT ALIGNMENT TUBE INSERTION/REMOVAL TOOL

[75] Inventors: Norbert L. Moulin, Placentia; James T. Hartley, Santa Ana, both of Calif.

[73] Assignee: Hughes Aircraft Company, Culver City, Calif.

[21] Appl. No.: 697,372

[22] Filed: Feb. 1, 1985

[51] Int. Cl.⁴ ............................................... B25B 27/14
[52] U.S. Cl. ...................................................... 29/271
[58] Field of Search .......................... 29/234, 271, 272

[56] References Cited

U.S. PATENT DOCUMENTS

| 3,182,387 | 5/1965 | Sundberg | 29/234 |
| 3,900,732 | 8/1975 | Costales | 29/271 |

FOREIGN PATENT DOCUMENTS

| 468757 | 1/1976 | U.S.S.R. | 29/234 |

Primary Examiner—James L. Jones, Jr.
Attorney, Agent, or Firm—Joseph E. Szabo; Anthony W. Karambelas

[57] ABSTRACT

A hand held tool 211 for inserting or removing a fiber optic contact alignment tube segment 47 into a fiber optic connector 13. The tool includes a hollow shaft 215 anchored in a knob 213 and extending coaxially through a cylindrical chamber in the knob. A core 225 having an axial bore extending therethrough resides rotatably in the chamber, with the post acting as its shaft. A shroud 235 extends from the core 225 and has an arcuate slot 237 near its tip. When an alignment tube segment 47 is inserted in the hollow post 221 and the shaft 215 is turned 180° relative to the core 225, an enlarged portion 48-2 of the base of the tube segment 47 enters into and is captured by the slot 237. The tool may then be inserted into a connector whose front end mirrors the front end of the tool 211. When the knob 213 is again turned 180°, the tube segment 47 is turned inside the connector causing its enlarged base portion 48-2 to enter a slot similar to the slot 237, thereby capturing the tube segment in the connector, after which the tool may be withdrawn.

8 Claims, 12 Drawing Figures

U.S. Patent  Dec. 17, 1985  Sheet 1 of 4  4,558,501
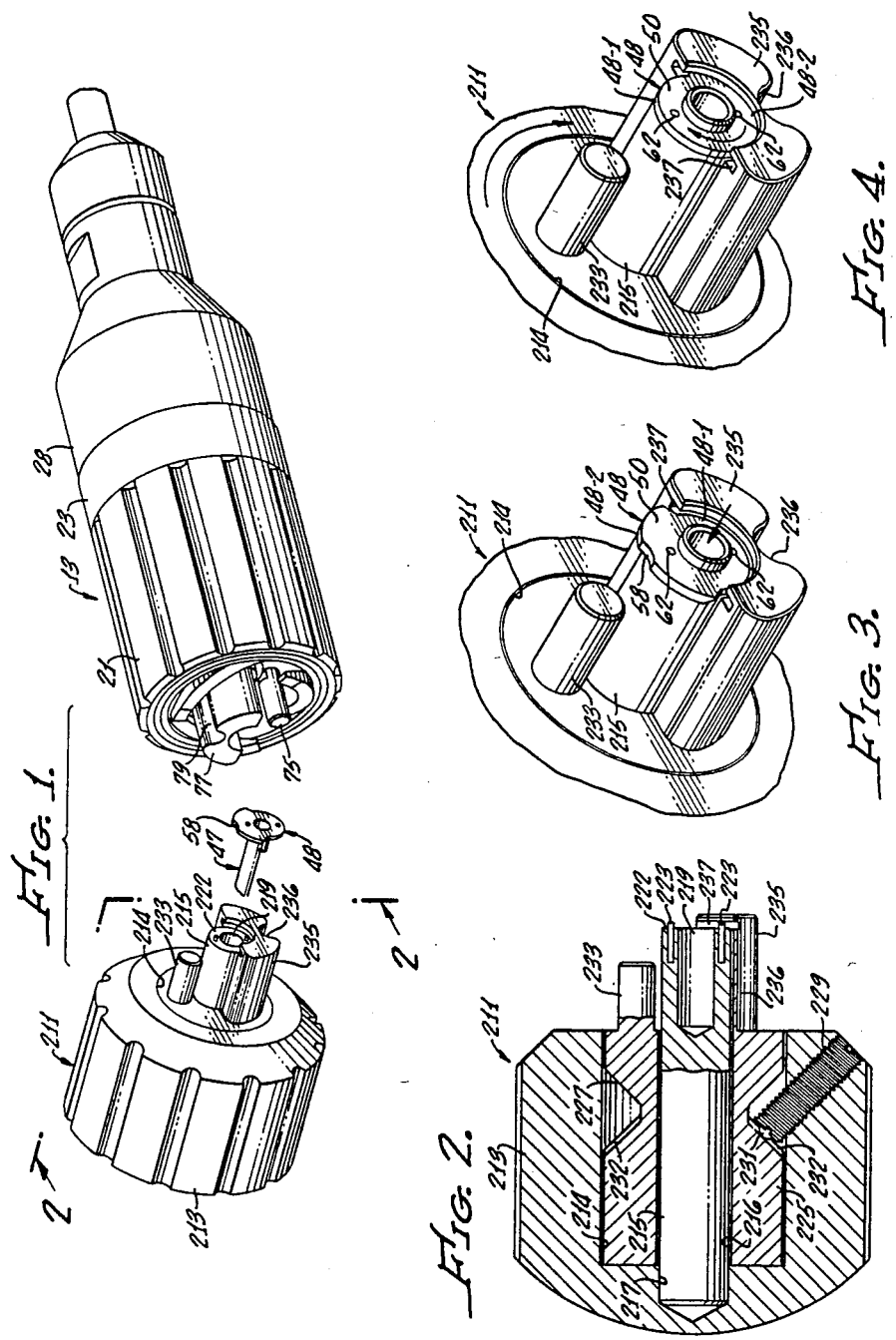

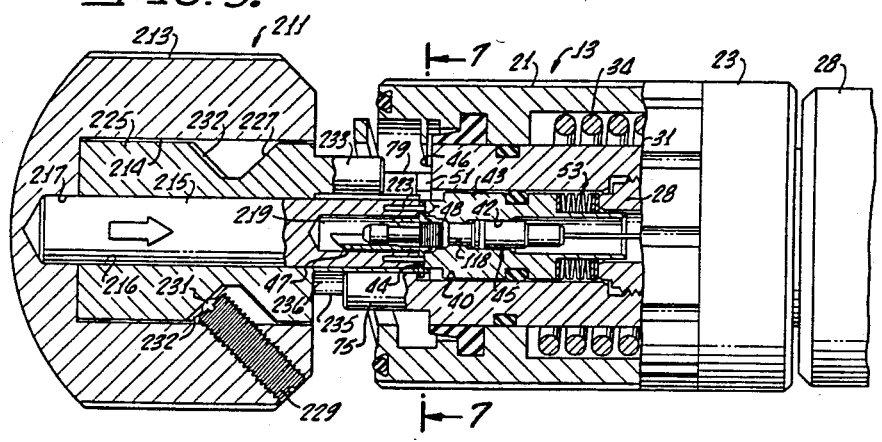
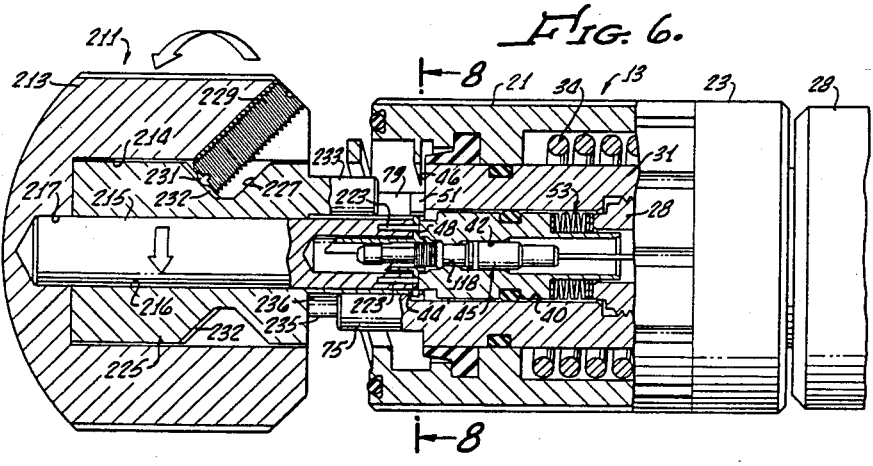
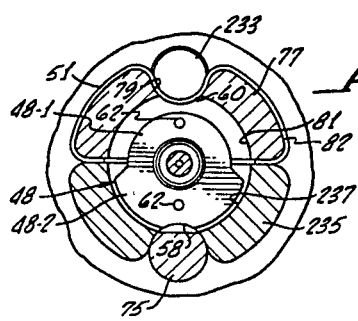
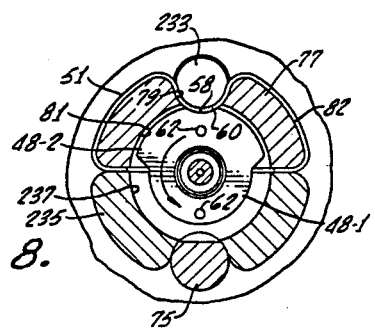

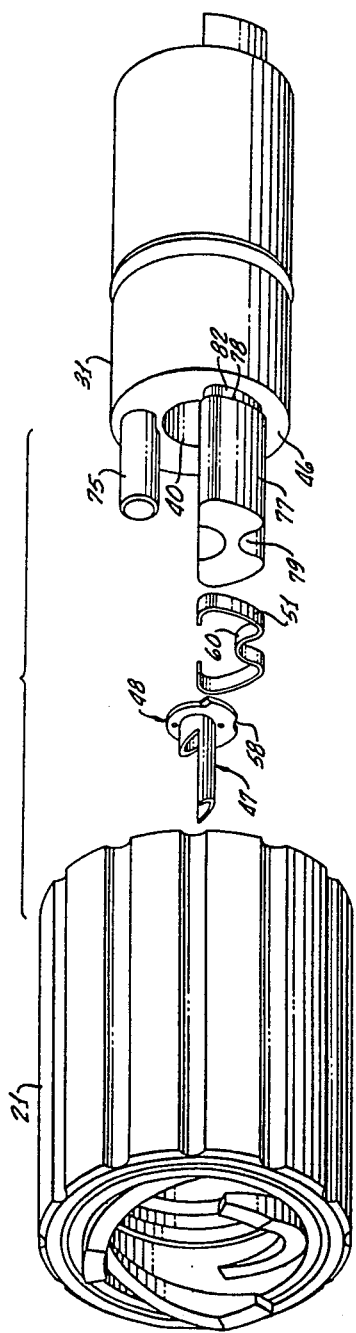
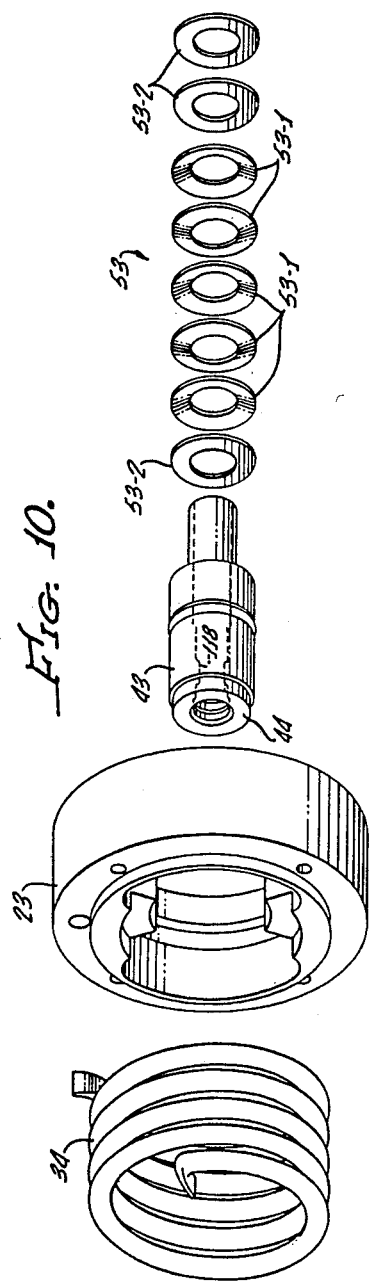

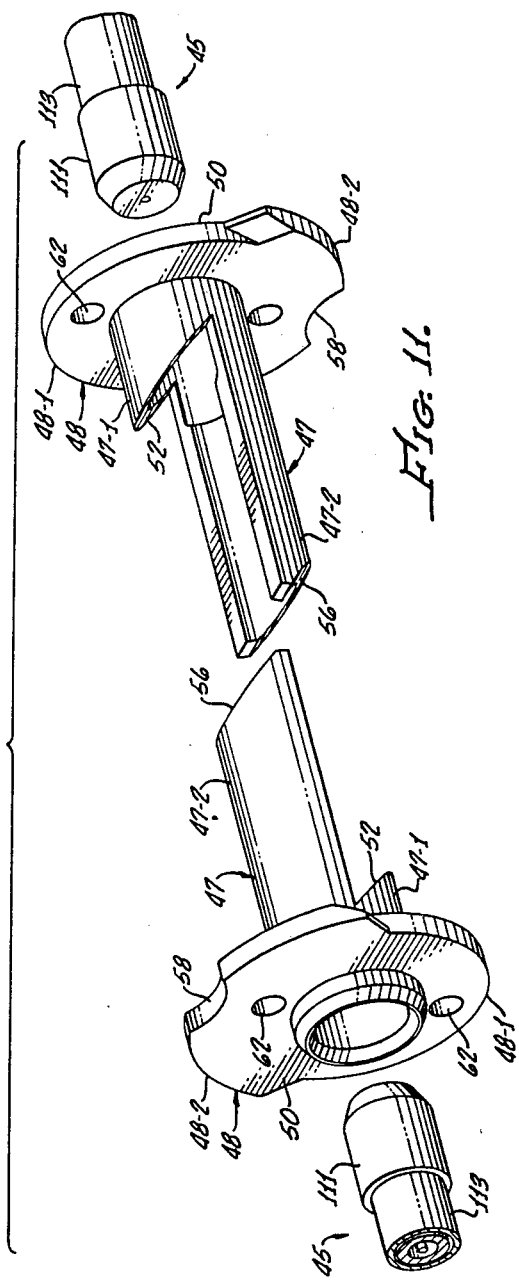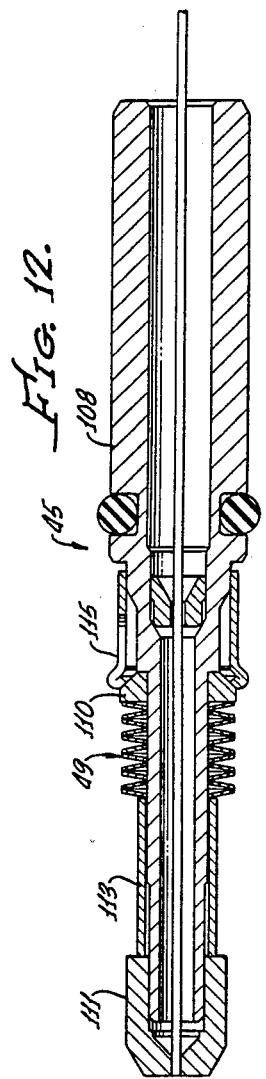

CONTACT ALIGNMENT TUBE INSERTION/REMOVAL TOOL

CROSS-REFERENCES TO RELATED APPLICATIONS

This patent application is related to U.S. patent application Ser. No. 697,368, filed February 1985, by Norbert L. Moulin, entitled "Coupling Mechanism For Connectors," assigned to the assignee of the present application.

BACKGROUND OF THE INVENTION

1. Field of the Invention

This invention is related to a tool for inserting or removing a tubular object into or from another member, and particularly for inserting or removing an alignment tube into or from the front end of a connector.

2. Description of Related Art

In fiber optic connectors, it is extremely important that contacts which are brought into mutual engagement by a pair of such connectors be precisely aligned so that they lie on a common axis. This is best accomplished by the use of an alignment tube into which the front portions of the mating contacts fit. In the patent application referenced hereinabove, there is described an arrangement whereby such an alignment tube is split into two identical parts which when interfitted form a single alignment tube. Each alignment tube segment comprises a tubular member having a baseplate which serves to anchor the alignment tube segment into the connector so that it shrouds its associated fiber optic contact. Retention of the alignment tube segment in the above-referenced connector is advantageously accomplished by providing a slotted receptacle in the front end of the connector and providing the baseplate of the alignment tube segment with an enlarged portion so that the alignment tube segment may be installed into the connector by inserting it therein and then turning the tube segment 180° so as to cause the enlarged portion of the baseplate to enter into and be retained by the slotted receptacle in the connector.

The actual size of a typical alignment tube segment is quite small and grasping it by hand to insert it in the connector or to remove it therefrom is not practical. Moreover, even if insertion or removal by hand were practical, turning of the tube segment by the right amount would require close attention and great care.

Accordingly, it is a principal object of the present invention to insert or remove a tubular member having an asymmetrically configured baseplate (such as an alignment tube segment of the type disclosed in the referenced patent application) into or from another member (typically a connector such as that disclosed in that application) having a slotted receptacle for receiving and retaining such a baseplate.

A more specific object of the present invention is to provide such a tool which makes the insertion and removal of the tubular member semi-automatic.

A related object of the invention is to provide a tool for inserting an alignment tube segment into a fiber optic connector having provision for inserting the alignment tube segment into the connector, turning it by a predetermined amount and withdrawing the tool from the connector, leaving the alignment tube segment captured therein.

A further related object of the invention is to provide a tool for removing an alignment tube segment from a fiber optic connector wherein it is held captured, by inserting the tool into the connector, turning it by a predetermined amount so as to transfer capture of the alignment tube segment from the connector to the tool, and withdrawing the tool and the alignment tube segment from the connector.

SUMMARY OF THE INVENTION

In accordance with the above and other objects of the invention, a tool is provided for inserting or removing a tubular member, such as a contact alignment sleeve segment having an assymetrically configured baseplate, into or from another member, such as a connector having a slotted receptacle for receiving and retaining the baseplate so as to lock the tubular member in position. The tool comprises a hollow shaft for receiving the tubular member up to, but not including, its baseplate. The tool also includes a core mounted coaxially with and rotatable relative to the shaft. A shroud extends from the core beyond the tip of the shaft and partially surrounds the shaft. A slot in the end of the shroud lies in a plane orthogonal to the axis of the post and serves to receive the baseplate of the tubular member when the core is turned relative to the shaft. In its preferred embodiment, the tool includes a knob having a cylindrical chamber terminating in an end wall. The post is anchored in the end wall and extends through the chamber coaxially therewith. The core, which is cylindrical in cross section, fits into the chamber for rotation therein, the core having an axial bore extending therethrough, the post extending through the bore and acting as a shaft upon which the core rotates within the knob.

The tubular member is first locked into position in the tool by inserting it in the hollow shaft and then turning the knob sufficiently relative to the core so that the shroud turns around the tubular member, causing an enlarged portion of its baseplate to enter into and be captured by the slot in the end of the shroud. With the tubular member thus captured, it is inserted into the member in which it is to be installed, such as a connector, by inserting the front end of the tool therein. Once in position, the knob of the tool is turned again, causing the tubular member to rotate to a position where its baseplate is free to leave the slotted shroud of the tool and to enter a similarly slotted member in the connector. To remove the tubular member from the connector by means of the tool, the above steps are simply reversed.

BRIEF DESCRIPTION OF THE DRAWINGS

The invention will be best understood by reference to the accompanying drawings in which:

FIG. 1 is a perspective view of a connector shown next to a tool for installing one of the alignment tube segments therein.

FIG. 2 is a cross section through the tool of FIG. 1 along line 2—2.

FIG. 3 is a partial perspective view of the tool shown in FIG. 1 with the alignment tube segment initially cradled therein.

FIG. 4 is a view similar to that shown in FIG. 3 but with the core of the installation tool turned so as to capture the alignment tube segment just preparatory to installation thereof into the connector.

FIG. 5 is a cross section through the installation tool and the connector of FIG. 1 showing them as they are initially engaged, with the alignment tube still captured in the tool.

FIG. 6 is a cross section similar to FIG. 5 but showing the installation tool turned 180° so as to cause the alignment tube to be transferred to and captured by the connector.

FIG. 7 is a cross section through FIG. 5 showing the orientation of the alignment tube relative to the connector prior to the 180° turn of the installation tool.

FIG. 8 is a cross section similar to FIG. 7 but showing the orientation of the alignment tube after the installation tool has been turned so as to lock the tube in the connector.

FIG. 9 is an exploded perspective view illustrating the relative orientations of the alignment tube segment and various parts of the connector.

FIG. 10 is an exploded perspective view of additional parts of the connector.

FIG. 11 is an exploded perspective view of a pair of contact alignment tube segments oriented just prior to engagement.

FIG. 12 is a cross section through a contact assembly.

DETAILED DESCRIPTION OF THE PREFERRED EMBODIMENT

A connector 13 into which a tubular alignment member may be inserted with a tool of the present invention is shown in FIGS. 1, 5 and 6.

The connector 13 is comprised of two principally cylindrical members which, when assembled, are rotatable relative to one another. The first of these members is a coupling ring 21 whose open back face is closed by a cap 23. The second cylindrical member, rotatably mounted within the coupling ring 21, comprises a shell as its front end. The back end of the connector 13 is irrelevant to the invention and will not be described.

Housed within the coupling ring 21 is a torque spring 34 whose purpose is to bias the coupling ring 21 resiliently against rotation relative to the shell 31.

Located coaxially within the shell 31 is an insert 43 whose purpose is to support an optical contact assembly 45. The insert 43 resides slidably within an axially-extending bore 40 within the shell 31. Carried on the front end of the insert 43 is an alignment tube segment 47 which when combined with an identical such segment forms an entire alignment tube. The base 48 (FIG. 9) of the alignment tube segment 47 rests against the forward surface 44 of the insert 43 (FIG. 10).

Extending from the front surface 46 of the shell 31 are a pair of aligning elements 75 and 77 (FIG. 9). The aligning element 75 is in the shape of a round post, and the aligning element 77 forms an arcuate shroud having an inner axially-running recess 81 and an outer axially-running groove 79. The two aligning elements 75 and 77 are so configured that when a pair of connectors is engaged to be mated, the aligning post 75 of each shell 31 will enter the aligning groove 79 of the other shell 31 so that the two intermating shells 31 become rotationally interlocked. Running along the root of the shroud 77 is a slot 82 for receiving an indexing spring 51. A centrally-disposed detent 60 in the spring 51 mates with a slight dimple 58 in the base 48 of the alignment tube segment 47, maintaining the tube against rotation relative to the shell 31. The aligning tube segment 47 is held in place against axial movement by a rear stop surface 78 at the base of the shroud 77 adjacent the slot 82.

The optical contact assembly 45 is shown in greater detail in FIG. 12. It includes a cylindrical tip in the form of contact bushing 111 adjacent to a spacer 113 which bears against a set of belleville springs 49. The bushing is shrunk-fitted onto the tip of a pin body 108 which forms the principal part of the contact assembly. Both the spacer 113 and the springs 49 are slideably mounted on the tip of the pin body 108. Next to the belleville springs 49 is a washer 110 and next to it is a retention clip 115. The optical contact assembly 45 is inserted into the axial bore 42 of the insert 43 during assembly so that the contact retention clip 115 securely retains the contact assembly within the insert 43. With the contact assembly so anchored in the insert 43, when pressure is exerted against the bushing 111, the axially moveable contact element, which includes the bushing 111, the contact spacer 113 and the contact body 108, is spring loaded by means of the belleville springs 49 which become compressed against the washer 110 seated in the retention clip 115. Moreover, the insert 43 itself is spring biased against axial movement relative to the shell 31 by a set of spring washers 53 (FIG. 10) disposed between insert 43 and the forward rim of the fiber accumulation chamber assembly member 28. The spring washers 53 are preferably comprised of two subsets: a first set of bowed washers 53-2 and, sandwiched between them, a second series of belleville springs 53-1. The bowed washers 53-2 require less force to compress them than do the belleville springs 53-1, and therefore become compressed first when pressure is exerted on the insert 43.

The contact assembly 45 is snapped in place in the insert 43 so that its retention clip 115 enters a constricted portion 118 (see FIG. 10) of the axial bore 42 which extends through the insert 43.

After the optical contact assembly 45 has been snapped in place in the insert 43, the alignment tube segment 47 may be inserted. This is the purpose of the present invention, a tool depicted in FIGS. 1-8. Before turning to that tool, however, the alignment tube segment 47 will be described in slightly greater detail.

A pair of axially-interfitting, mutually-complementary alignment tube segments 47 is illustrated in perspective view in FIG. 11. The tube segments 47 are identical and, when interfitted, constitute an alignment tube having a single longitudinal axis. Each tube segment includes a pair of axially spaced-apart, parallel end walls 52 and 56, at which the segments 47 abut when they are interfitted. Furthermore, each tube segment 47 comprises a root portion 47-1 which is fully cylindrical in cross section and terminates in the first end wall 52, and an elongated tip portion 47-2 which is semi-cylindrical in cross section and terminates in the second end wall 56. Integral with the root portion 47-1 is the generally disk-shaped base 48 having a first portion 48-1 of relatively reduced diameter relative to the second portion 48-2 of the base having the aligning recess 58 at its center. A pair of holes 62 in the base serve to orient the tube segment when it is installed by means of the insertion tool 211 described with reference to FIGS. 1-8.

In the connector disclosed herein, the tube segment 47 forms a part of a contact alignment system which includes a contact assembly 45 having an alignment bushing 111 slideably mounted within, and approximately coaxially with, the tube segment 47. The contact assembly 45 is mounted inside the axial bore 42 of the connector's insert 43. The tube segment 47, on the other hand, is mounted on the front stopping surface 44 of the insert 43. Due to the elasticity of the belleville springs 49 which form part of the connector assemblies 45, the bushings 111 are slideable relative to their associated tube segments 47.

By means of the tool to be described with reference to FIGS. 1-8, the alignment tube segment 47 is inserted with its base 48 oriented so that its reduced diameter portion 48-1 is adjacent to the recess 81 in the shroud 77. This reduced diameter portion 48-1 is of substantially the same radius as the recess 81 so that there is sufficient clearance that the alignment tube segment 47 can be moved axially toward the axial bore 40 of the shell 31. When the stop surface 50 of the alignment tube base 48 abuts the front stopping surface 44 of the insert 43, sufficient pressure is exerted by means of the insertion tool upon the alignment tube base 48 to partially compress the spring washers 53. This provides sufficient clearance between the insert front stopping surface 44 and the shroud insert front stopping surface 78 to allow the alignment tube segment 47 to be rotated 180° about its longitudinal axis, thereby moving the larger diameter portion 48-2 of its base 48 into abutment against the stop surface 78 of the insert shroud 77. This also causes the detent 60 in the indexing spring 51 to interlock with the recess 58 in the alignment tube base 48. This is made possible by a centrally-disposed opening in the indexing spring recess 82 through which the detent 60 can extend into the dimple 58 in the alignment tube segment base 48.

More particularly, the insertion/removal tool 211 depicted in FIGS. 1-8 comprises a knurled knob 213 sized typically to be conveniently held and grasped by one hand. Centrally disposed within the knob 213 is a cylindrical cavity 214 through which extends a post 215 anchored in the rear wall of the knob in a countersunk hole 217 into which it is shrink fitted. Disposed within the cylindrical cavity 214 is a core 225 having a cylindrical base through which there extends an axial bore 216 into which the shaft 215 snugly fits. The core 225 is retained in its cavity 214 by the provision of a peripherally-extending V-shaped groove 227 which interacts with a retaining bolt 229 having a spring-loaded ball 231 at its end. The core 225 is held in place in its cavity 214 so that the knob 213 is free to rotate around the core 225, with the post 215 acting as its shaft and the core 225 acting as a bearing for that shaft. A pair of indents 232 in the rear wall of the V-shaped groove 227 and spaced 180° apart, in cooperation with the spring-loaded ball 231, provide a pair of "detent" positions for the knob 213 relative to the core 225.

The protruding end of the post 215 has a cylindrical bore 219 which extends sufficiently far to permit the shank of the alignment tube segment 47 to be fully inserted therein with the base 48 thereof resting on the rim 222 of the post 215. Securely anchored in the rim 222 of the post 215 which defines the bore 219 are a pair of guide pins 223 which extend from the rim 222 just enough to fully enter a pair of guide holes 62 in the base 48 of the alignment tube segment when that segment is fully inserted in the tool, as seen in FIG. 3.

Extending from the cylindrical base of the core 225 is a guide post 233 and a retaining shroud 235. The post 233 and the shroud 235 are nearly identical in shape to the corresponding aligning elements 75 and 77 of the connector 13, so that when the tool is inserted into the front end of the connector 13, the post 233 enters into the aligning groove 79 of the connector's shroud 77, and similarly the aligning post 75 of the connector 13 enters the aligning groove 236 of the shroud 235 of the tool 213. The principal difference between the corresponding shroud members 235 and 77 on the tool 213 and the connector 13, respectively, is the provision of an arcuate slot 237 near the tip of the retaining shroud 235.

The retaining slot 237 and its purpose are best seen in FIGS. 3 and 4. To install the alignment tube segment 47 into the connector 13, it is first inserted into the tool post 215 as shown in FIG. 3. The tool there is shown in one of its two "detent" positions in which its guide pins 223 are so located that when they enter the guide holes 62 in the alignment tube base 48 the reduced diameter portion 48-1 of the base is in registry with, and clears the edges of, the retaining shroud 235.

The next step is simply to turn the knob 213 of the tool relative to its core 225. Since the shaft 215 is fastened to and turns with the knob 213, the alignment tube segment 47 is turned about its axis 180°, causing the enlarged diameter portion 48-2 of its base fully to enter the retaining groove 237. This orientation of the knob 213 relative to the core 225 represents the second "detent" position of the tool, and it is securely held in that position until the knob is again turned.

With the alignment tube segment 47 securely held in the tool 211, the tool is next inserted into the front end of the connector 13, as shown in FIG. 5. With the tool 211 fully inserted in the connector 13, the alignment tube segment 47 is so positioned that its rear stop surface 50 is brought to rest against the front stop surface 44 of the connector insert 43. As best seen in FIG. 7, the retaining spring 51 is in place in the connector 13, but the alignment tube segment 47, and particularly its base 48, is not yet locked in place in the connector because the enlarged portion 48-2 of the base 48 is located opposite the alignment post 75 of the connector which has a slight flat at its root to provide a clearance for that purpose.

To lock the alignment tube segment 47, and particularly its base 48, in position, the insertion/removal tool knob 213 is turned 180°, into its first "detent" position in which the alignment tube segment base 48 is free to exit therefrom, as shown in FIG. 3. This half turn of the knob 213 also has the effect of rotating the alignment tube segment base 48 relative to the connector 13, and in particular relative to its alignment tube shroud 77 and the indexing spring 51. As a result, the enlarged portion 48-2 of the alignment tube segment base 48 is turned so as to fully enter the slot 82 at the base of the shroud 77 (see FIG. 9 for this detail of the slot 82). In this position the base 48 is held securely by the front stopping surface 78 of the shroud 77 against axial movement, and is locked against rotation by the engagement of its dimple 58 by the detent 60 of the indexing spring 51. Consequently, when the insertion/removal tool 211 is withdrawn, the alignment tube segment 47 is securely held in position in the connector 13.

To remove an alignment tube against 47, the above procedure is simply reversed. Thus, the first step in removing the segment 47 is to insert the tool into the front end of the connector 13, with the tool being oriented as shown in FIG. 3. This will cause the pins 223 of the tool to enter the orientation holes 62 in the base of the alignment tube segment 47. The knob 213 of the tool is then turned 180°, turning the alignment tube segment 47 with it. This causes the enlarged base segment 48-2 of the tube segment 47 to exit from the slot 82 at the base of the shroud 77 and to enter the retaining slot 237 in the tip of the tool 211. With the alignment tube segment 47 thus freed from the connector and captured in the tool 211, it may be withdrawn with the tool from the connector.

Thus, it may be seen that there has been provided in the field of connectors a very useful tool by which a hard to reach item such as an alignment tube segment may be either inserted or removed in the field in a semi-automatic manner.

What is claimed is:

1. A tool for inserting or removing a tubular member having an asymmetrically configured baseplate into another member having a slotted receptacle for receiving and retaining said baseplate comprising in combination:
   (a) a hollow shaft or post for receiving said tubular member up to, but not including, its baseplate;
   (b) a core mounted coaxially with and rotatable relative to said shaft;
   (c) a shroud extending from said core beyond the tip of said shaft and partially surrounding said shaft; and
   (d) a slot in the end of said shroud lying in a plane orthogonal to the axis of said post or shaft for receiving the baseplate of said tubular member when said core is turned relative to said shaft.

2. The tool of claim 1 characterized further in that:
   (a) said core has an axial bore extending therethrough;
   (b) said post or shaft extends through said bore to permit rotation of said core upon said post as its shaft; and in that
   (c) said tool additionally includes means to restrain axial movement of said core upon said shaft.

3. The tool of claim 2 characterized further in that said shroud is configured to interfit with an alignment post extending from said other member into which said tubular member is to be installed by said tool.

4. The tool of claim 3 characterized further in that said core additionally includes an alignment post extending from said core diametrically opposite said shroud and configured to interfit with an alignment shroud extending from said other member and having the same contour as the alignment shroud which extends from said bore.

5. The tool of claim 2 characterized further in that:
   (a) said tool additionally includes a knob having a chamber terminating in an end wall;
   (b) said post is anchored in said end wall and extends through said chamber; and
   (c) said core fits into said chamber for rotation therein.

6. The tool of claim 1 characterized further by a plurality of pins mounted on the rim of said hollow shaft for keying engagement with a corresponding plurality of index holes in said baseplate.

7. The tool of claim 5 characterized further by:
   (a) keying means on said shaft to rotationally locate said tubular member on said shaft; and
   (b) means on said core for providing a pair of stop positions for said core, said stop positions located to register respectively with the positions in which the base of said tubular member is within and outside of the slot in said shroud.

8. The tool of claim 7 characterized further in that said plurality of pins comprise a pair of pins mounted 180° apart on the rim of said hollow shaft and in that said means for providing a pair of stop positions includes a groove running around the periphery of said core and a pair of recesses located 180° apart in a wall of said groove.

* * * * *